United States Patent
Kojima

(10) Patent No.: US 7,562,935 B2
(45) Date of Patent: Jul. 21, 2009

(54) SEAT RECLINING APPARATUS

(75) Inventor: Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 375 days.

(21) Appl. No.: 11/517,474

(22) Filed: Sep. 8, 2006

(65) Prior Publication Data

US 2007/0057558 A1 Mar. 15, 2007

(30) Foreign Application Priority Data

Sep. 15, 2005 (JP) ............................. 2005-268578

(51) Int. Cl.
*B60N 2/22* (2006.01)
(52) U.S. Cl. ................................................... 297/367
(58) Field of Classification Search .............. 297/367
See application file for complete search history.

(56) References Cited

U.S. PATENT DOCUMENTS 6,318,806 B1 * 11/2001 Levert et al. ............. 297/367
6,543,851 B2 * 4/2003 Schillak ................ 297/367 X
6,755,470 B2 * 6/2004 Iwata et al. .............. 297/362
6,910,737 B2 * 6/2005 Hosokawa ............... 297/362
7,168,764 B2 * 1/2007 Reubeuze et al. ......... 297/367
2002/0041119 A1 4/2002 Kojima et al.

FOREIGN PATENT DOCUMENTS

JP 58101316 A * 6/1983 ............. 297/367
JP 2002-101996 4/2002

* cited by examiner

*Primary Examiner*—Anthony D Barfield
(74) *Attorney, Agent, or Firm*—Buchanan Ingersoll & Rooney PC

(57) ABSTRACT

A seat reclining apparatus includes a first member attached to one of a seatback frame and a seat cushion frame and including engaged portions, a second member attached to the other one of the seatback frame and the seat cushion frame, and a cam member bringing engaging members to move in a radial direction so as to engage or disengage between the engaged portions and the engaging members. The cam member includes a pivot axis arranged in such a manner that a simultaneous engagement or disengagement is achieved among each engaging member and the corresponding engaged portion when center axes of the first member and the second member are offset to each other by an amount corresponding to a clearance formed between the first member and the second member because of a load applied to the seatback frame in a case where a seatback is tilted.

12 Claims, 12 Drawing Sheets

SEAT RECLINING APPARATUS

CROSS REFERENCE TO RELATED APPLICATIONS

This application is based on and claims priority under 35 U.S.C. § 119 to Japanese Patent Application No. 2005-268578, filed on Sep. 15, 2005, the entire content of which is incorporated herein by reference.

FIELD OF THE INVENTION

This invention generally relates to a seat reclining apparatus. More particularly, the present invention pertains to a seat reclining apparatus provided between a seat cushion and a seatback so as to connect the seatback to the seat cushion in a rotatable manner and restrain the seat back at a predetermined angle relative to the seat cushion.

BACKGROUND

A known seat reclining apparatus is disclosed in JP2002-101996A. The seat reclining apparatus disclosed includes a lower guide 51, an upper gear 52, a ring holder 53, three pawls 54, a cam 55, and a locking spring 56 as shown in FIG. 11. The lower guide 51 is fixed to a seat cushion frame (not shown) while the upper gear 52 is fixed to a seatback frame (not shown). An outer peripheral face 52a of the upper gear 52 and an inner peripheral face 51a of the lower guide 51 are slidably engageable with each other so that the lower guide 51 and the upper gear 52 are relatively rotatable to each other. In addition, the lower guide 51 and the upper gear 52 are connected to each other through the ring holder 53 so as not to separate from each other.

The seat reclining apparatus disclosed farther includes a mechanism for retaining an angle of the upper gear 52 relative to the lower guide 51. That is, as shown in FIG. 12, the upper gear 52 includes internal teeth 52b on an inner peripheral side. Meanwhile, the three pawls 54 include external teeth 54a on an outer peripheral side engageable with the internal teeth 52b of the upper gear 52. The cam 55 rotates, while being guided by the lower guide 51, to move the three pawls 54 in a radial direction so as to engage or disengage the external teeth 54a of the three pawls 54 with the internal teeth 52b of the upper gear 52. The cam 55 is operated to rotate in association with the operation of a lever shaft 58 connected to an operation lever (not shown). The locking spring 56 biases the cam 55 in a direction in which the pawls 54 engage with the internal teeth 52b of the upper gear 52. The cam 55 and the pawls 54 are guided by guide portions 57 formed on the lower guide 51. Further, a biasing spring is normally arranged between the seat cushion frame and the seatback frame for biasing the seatback frame in a forward direction though it is not disclosed in JP2002-101996A.

According to the aforementioned seat reclining apparatus, in order to enable a relative rotation between the upper gear 52 and the lower guide 51, a predetermined clearance C is formed between the outer peripheral face 52a of the upper gear 52 and the inner peripheral face 51a of the lower guide 51 as shown in FIG. 12. In case of changing the angle of the seatback relative to the seat cushion, the cam 55 rotates so as to release the engagement of the pawls 54 with the internal teeth 52b of the upper gear 52. The upper gear 52 may be movable and eccentric to the lower guide 51 within the clearance C accordingly. When the engagement of the pawls 54 with the upper gear 52 is released so as to tilt the seatback, the seatback frame normally receives a load in a substantially downward direction due to a weight of the seatback, a load added by an occupant to the seatback, and the like. Thus, the upper gear 52 fixed to the seatback frame is shifted in the downward direction from the lower guide 51 fixed to the seat cushion frame by an amount corresponding to the clearance C. That is, a center axis of the outer peripheral face 52a of the upper gear 52 is made offset in the downward direction to the inner peripheral face 51a of the lower guide 51. A pivot axis of the cam 55 guided by the lower guide 51 is also made offset to the internal teeth 52b of the upper gear 52. As a result, engagement or disengagement timings of the three pawls 54 operated by the cam 55 relative to the internal teeth 52b of the upper gear 52 are not equal, which leads to an uncomfortable operation feeling of the seat reclining apparatus.

Thus, a need exists for a seat reclining apparatus that can reduce an effect of an offset between an upper gear and a lower guide resulting from a clearance formed at a rotatably connecting portion between a seatback frame and a seat cushion frame because of a load applied to a seatback frame when a seatback is tilted. Further, a need exists for a seat reclining apparatus that can achieve a simultaneous engagement or disengagement between engaging members and engaged members, respectively.

SUMMARY OF THE INVENTION

According to an aspect of the present invention, a seat reclining apparatus includes a first member attached to one of a seatback frame and a seat cushion frame and including engaged portions, a second member attached to the other one of the seatback frame and the seat cushion frame and rotatably engageable with the first member, engaging members interposed between the first member and the second member, and a cam member rotatably guided by the second member and bringing the engaging members engageable with the engaged portions to move in a radial direction so as to engage or disengage between the engaged portions and the engaging members. The cam member includes a pivot axis arranged in such a manner that a simultaneous engagement or disengagement is achieved among each engaging member and the corresponding engaged portion when a center axis of the first member and a center axis of the second member are offset to each other by an amount corresponding to a clearance formed at a rotatably connecting portion between the first member and the second member because of a load applied to the seatback frame in a case where a seatback is tilted.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
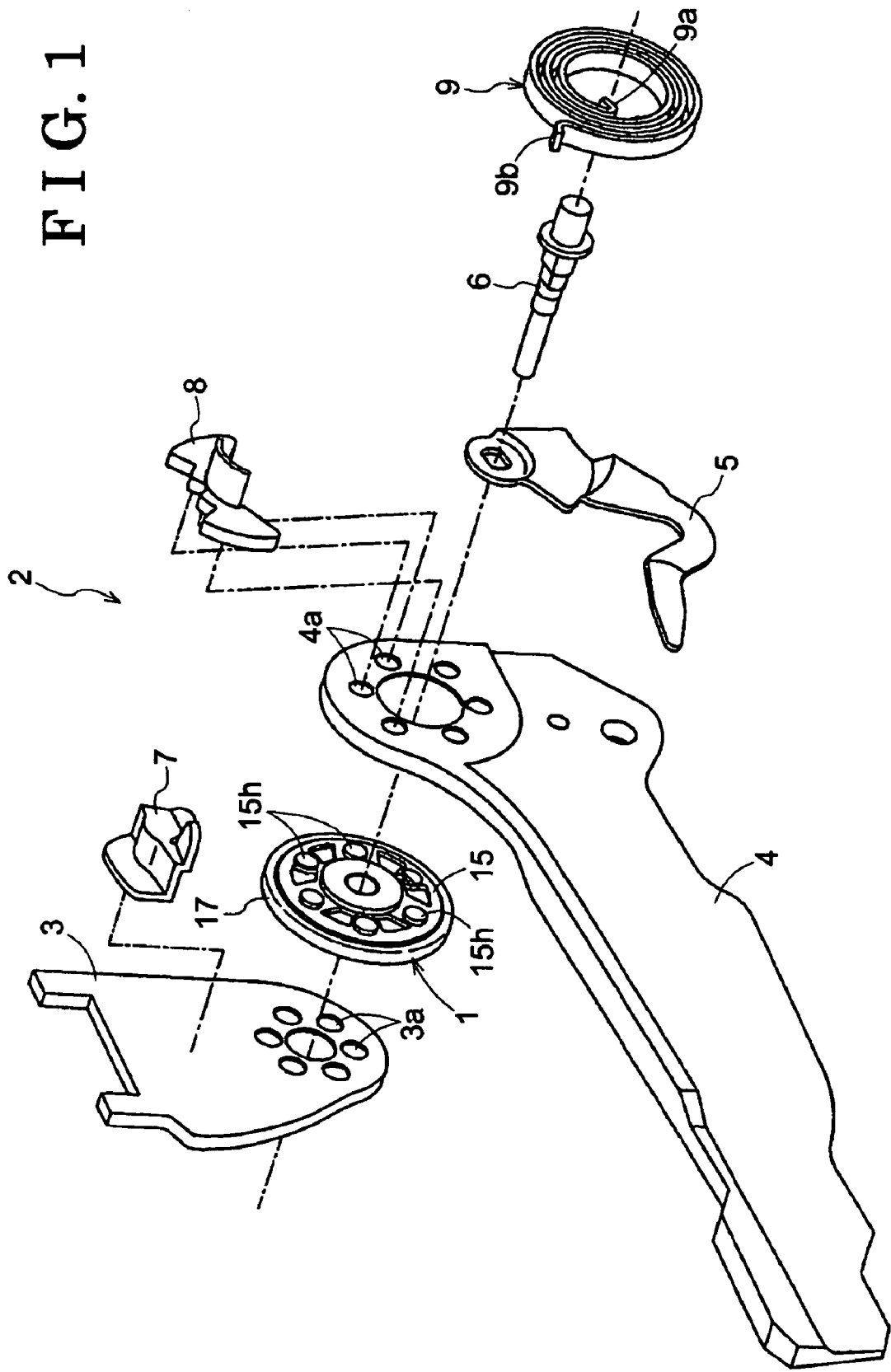
FIG. 1 is an exploded perspective view showing a whole structure of a seat reclining apparatus according to a first embodiment of the present invention.

A first embodiment of the present invention will be explained with reference to the attached drawings. According to the present embodiment, a seat reclining apparatus 2 is employed in a vehicle seat. FIG. 1 is an exploded perspective view showing a whole structure of the seat reclining apparatus 2.

As shown in FIG. 1, the seat reclining apparatus 2 includes a seatback frame 3 constituting a seatback, a seat cushion frame 4 constituting a seat cushion, a locking device 1 provided at a contact portion between the seatback frame 3 and the seat cushion frame 4, a lever 5 serving as an operating portion of the locking device 1, and a lever shaft 6. When the locking device 1 is in a locked state, an angle of the seatback frame 3 is unchanged and fixed relative to the seat cushion frame 4. On the other hand, when the lever 5 is operated so that the locking device 1 is brought to an unlocked state (i.e. state shown in FIG. 4), an angle of the seatback frame 3 is variable relative to the seat cushion frame 4.

Further, as shown in FIG. 1, a biasing spring 9 constituted by a spiral spring includes an inner end portion 9a engaging with an inner engaging member 7 and an outer end portion 9b engaging with an outer engaging member 8. At this time, the inner engaging member 7 is attached to the seatback frame 3 while the outer engaging member 8 is attached to the seat cushion frame 4. Accordingly, the biasing spring 9 biases the seatback frame 3 in a forward direction of the seat (i.e. left front side in FIG. 1). The same structure as above except for the lever 5 is provided on an opposite side of the seat in a width direction. The lever shaft 6 is connected to another lever shaft that has the same structure and provided on the opposite side of the seat in the width direction. Then, when the lever 5 is operated, a locking device provided on the opposite side of the seat is operated simultaneously.

Figure 2:
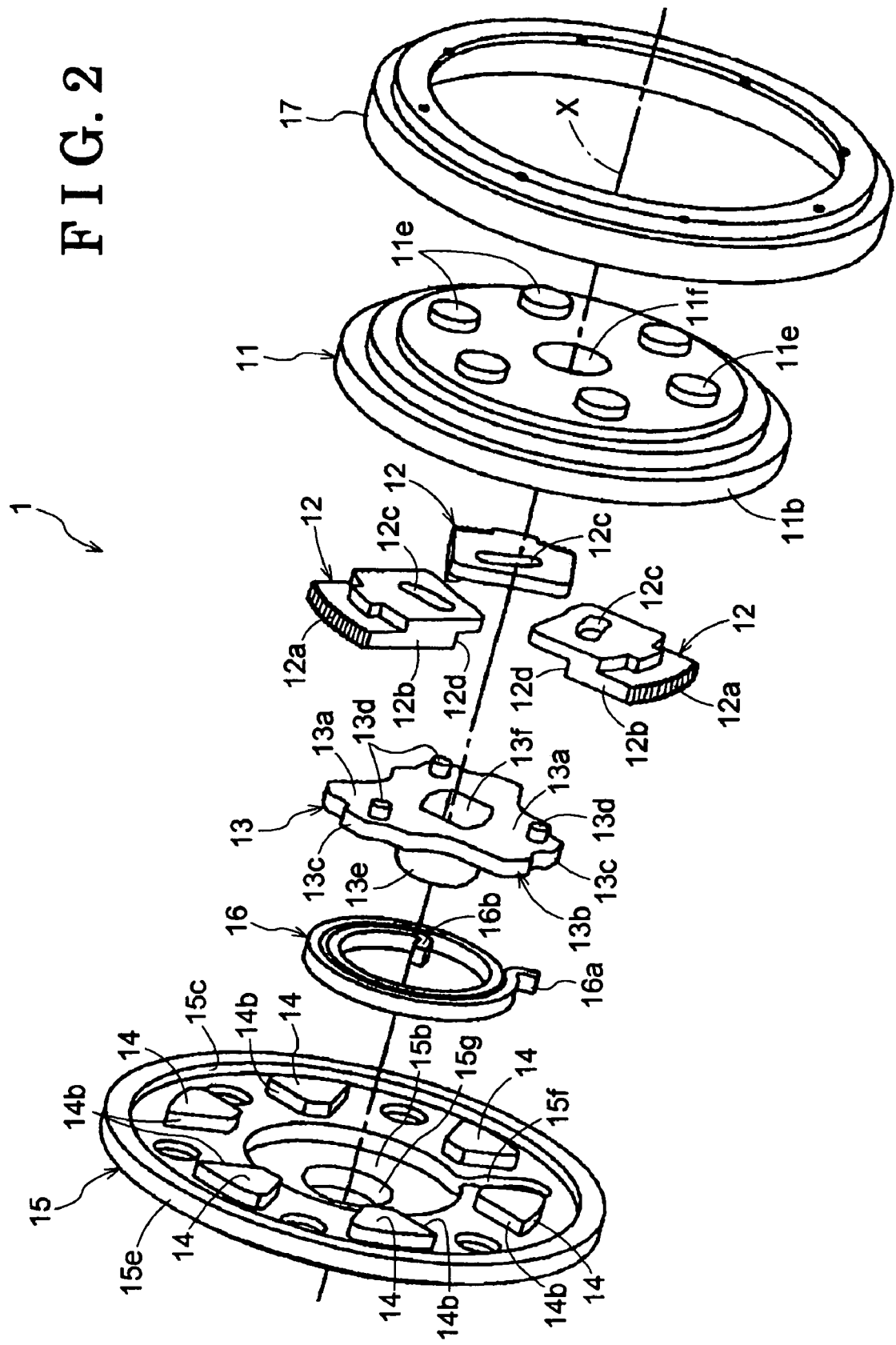
FIG. 2 is an exploded perspective view of a locking device according to the first embodiment of the present invention.
Figure 3:
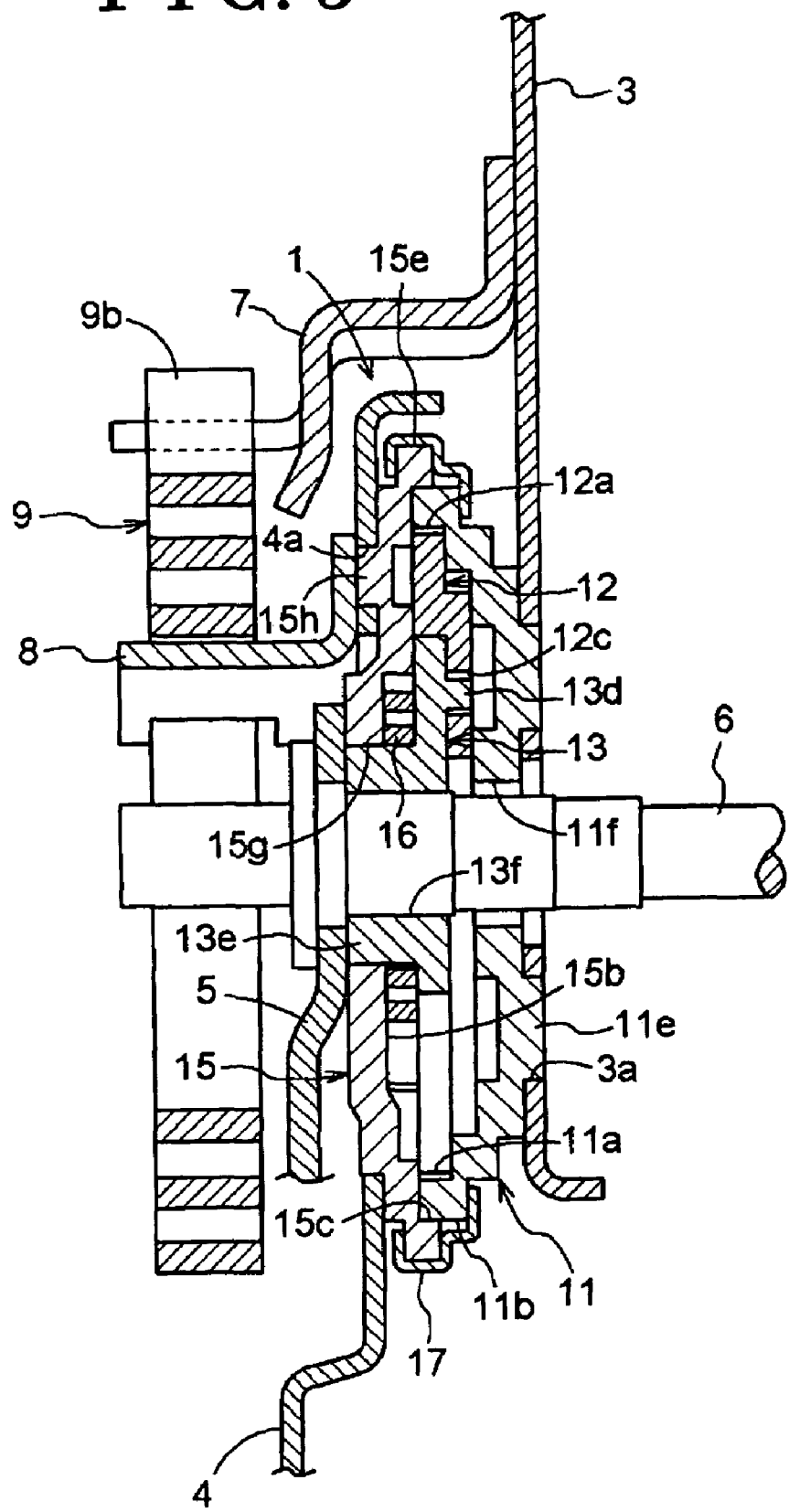
FIG. 3 is a longitudinal sectional view of the seat reclining apparatus according to the first embodiment of the present invention.
Figure 4:
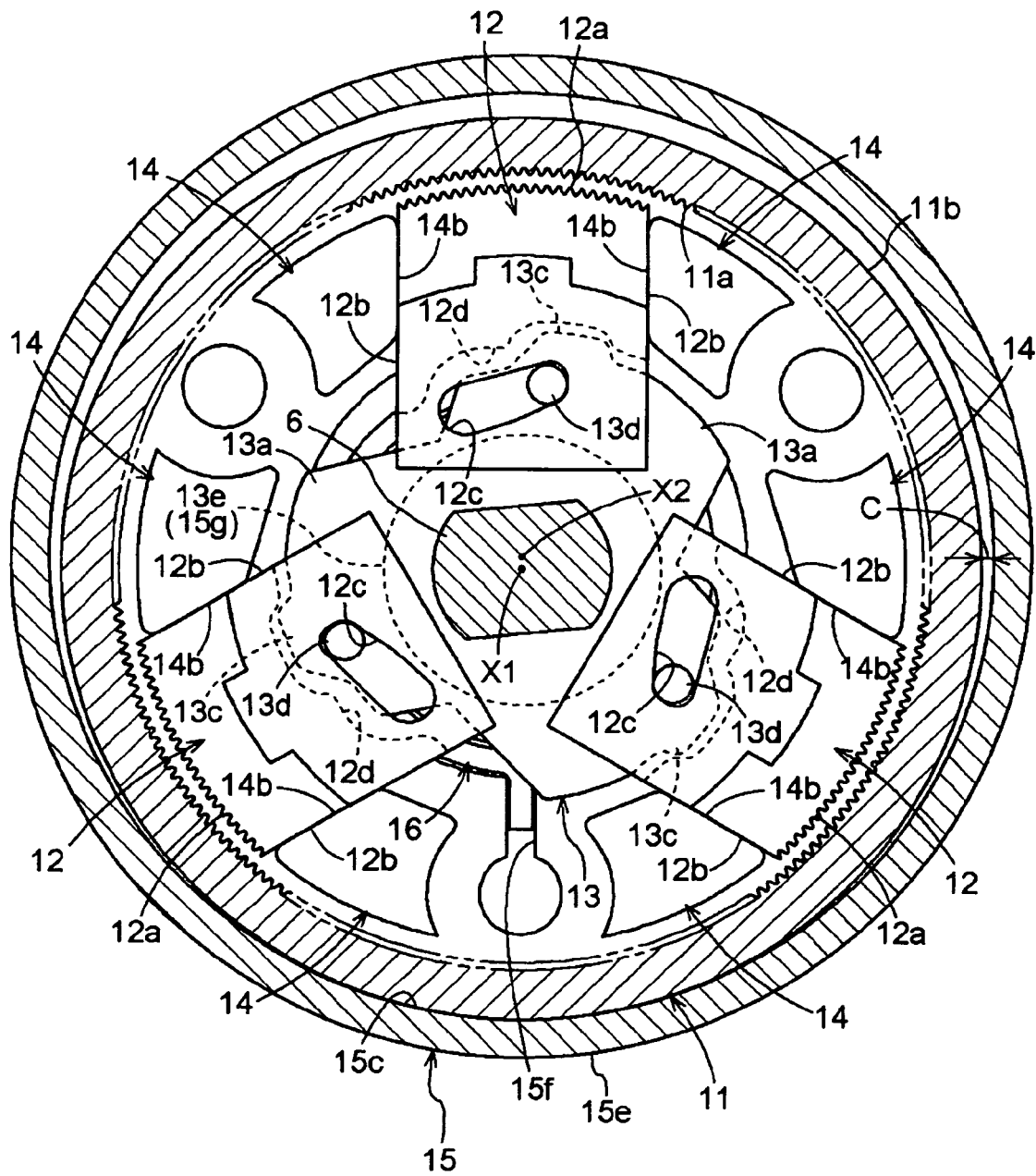
FIG. 4 is an internal structure view showing an unlocked state of the locking device according to the first embodiment of the present invention.
Figure 5:
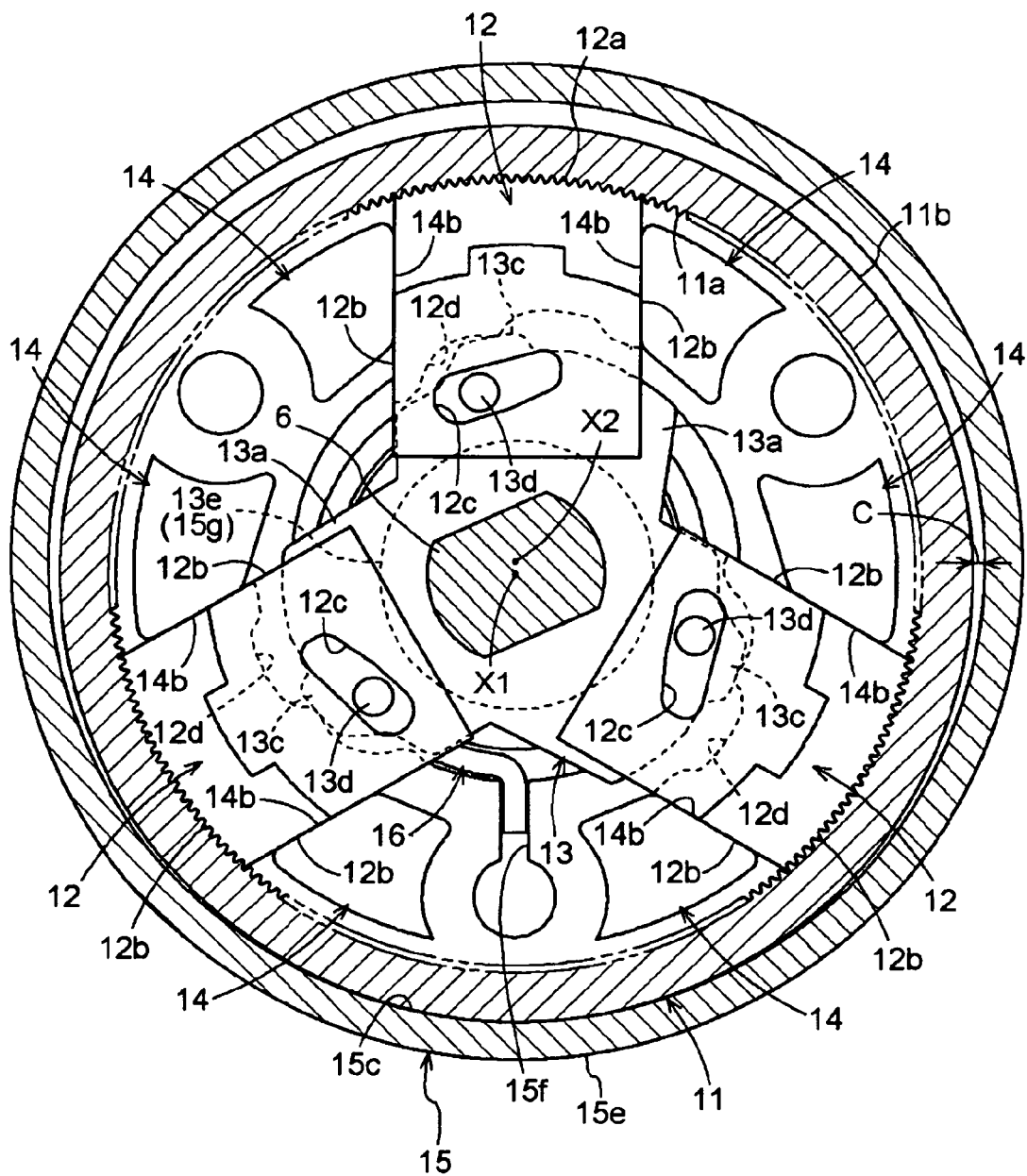
FIG. 5 is an internal structure view showing a locked state of the locking device according to the first embodiment of the present invention.

Next, a structure of the locking device 1 is explained in detail. FIG. 2 is an exploded perspective view of the locking device 1. FIG. 3 is a longitudinal sectional view of the seat reclining apparatus 2. FIG. 4 is an internal structure view showing the unlocked state of the locking device 1. FIG. 5 is an internal structure view showing the locked state of the locking device 1. As shown in FIGS. 2 to 5, the locking device 1 includes an upper gear 11 (first member), three pawls 12 (engaging member), a cam 13 (cam member), a lower guide 15 (second member), a locking spring 16, and a ring holder 17. According to the present embodiment, as shown in FIG. 3, the upper gear 11 is attached to the seatback frame 3 while the lower guide 15 is attached to the seat cushion frame 4. The upper gear 11 and the lower guide 15 engage with each other in a relatively rotatable manner. Then, the ring holder 17 is assembled on a radially outer side of the upper gear 11 and the lower guide 15 so that the upper gear 11 and the lower guide 15 are prevented from separating from each other. As shown in FIG. 3, the upper gear 11 includes internal teeth 11a (engaged portion) on an inner peripheral face. Each of the three pawls 12 has external teeth 12a that are formed on an outer peripheral face and are engageable with the internal teeth 11a. When the lever 5 is operated and then the cam 13 is rotated through the lever shaft 6 (see FIG. 1), the three pawls 12 move in a radial direction, which leads to an engagement or disengagement of the external teeth 12a relative to the internal teeth 11a of the upper gear 11. Accordingly, the relative rotation between the upper gear 11 and the lower guide 15 is permitted or restricted. Each movement of the three pawls 12 and the cam 13 is guided by the lower guide 15. The locking spring 16 biases the cam 13 in a direction in which the external teeth 12a of the pawls 12 engage with the internal teeth 11a of the upper gear 11 (i.e. counterclockwise direction in FIG. 4).

A structure of each component of the locking device 1 is explained in detail below.

The upper gear 11 has a substantially disc shape. An outer peripheral sliding face 11b (first sliding face) having a cylindrical shape is formed on an outer periphery of the upper gear 11. The outer peripheral sliding face 11b faces an inner peripheral sliding face 15c of the lower guide 15, which is explained later, so as to be slidable thereon. In addition, a concave portion that includes an inner peripheral face having a cylindrical shape and coaxial with the outer peripheral sliding face 11b is formed on the upper gear 11 on a side facing the lower guide 15. The internal teeth 11a are formed on this cylindrical inner peripheral face of the concave portion. As shown in FIGS. 4 and 5, an X1 is a center axis of the outer peripheral sliding face 11b and the inner-peripheral face on which the internal teeth 11a are formed. The concave portion of the upper gear 11 forms, together with a concave portion of the lower guide 15 that is explained later, a space for accommodating the pawls 12, the cam 13, and the locking spring 16 in a state in which the upper gear 11 engages with the lower guide 15. Further, as shown in FIGS. 2 and 3, an insertion hole 11f is formed on a center of the upper gear 11 and into which the lever shaft 6 is inserted. According to the present embodiment, the "cylindrical" shape is an example of a circumferential shape in cross-section.

The upper gear 11 includes multiple (six, for example) engaging convex portions 11e on a side not facing the lower guide 15 in such a manner that the engaging convex portions 11e are arranged at even intervals in the circumferential direction. The seatback frame 3 includes multiple (six, for example) engaging bores 3a on positions facing the engaging convex portions 11e, respectively. While the engaging convex portions 11e engage with the engaging bores 3a, respectively, the upper gear 11 is integrally fixed to the seatback frame 3 by means of welding, and the like. The upper gear 11 having the aforementioned structure is formed by, for example, a half die cutting.

Figure 6:
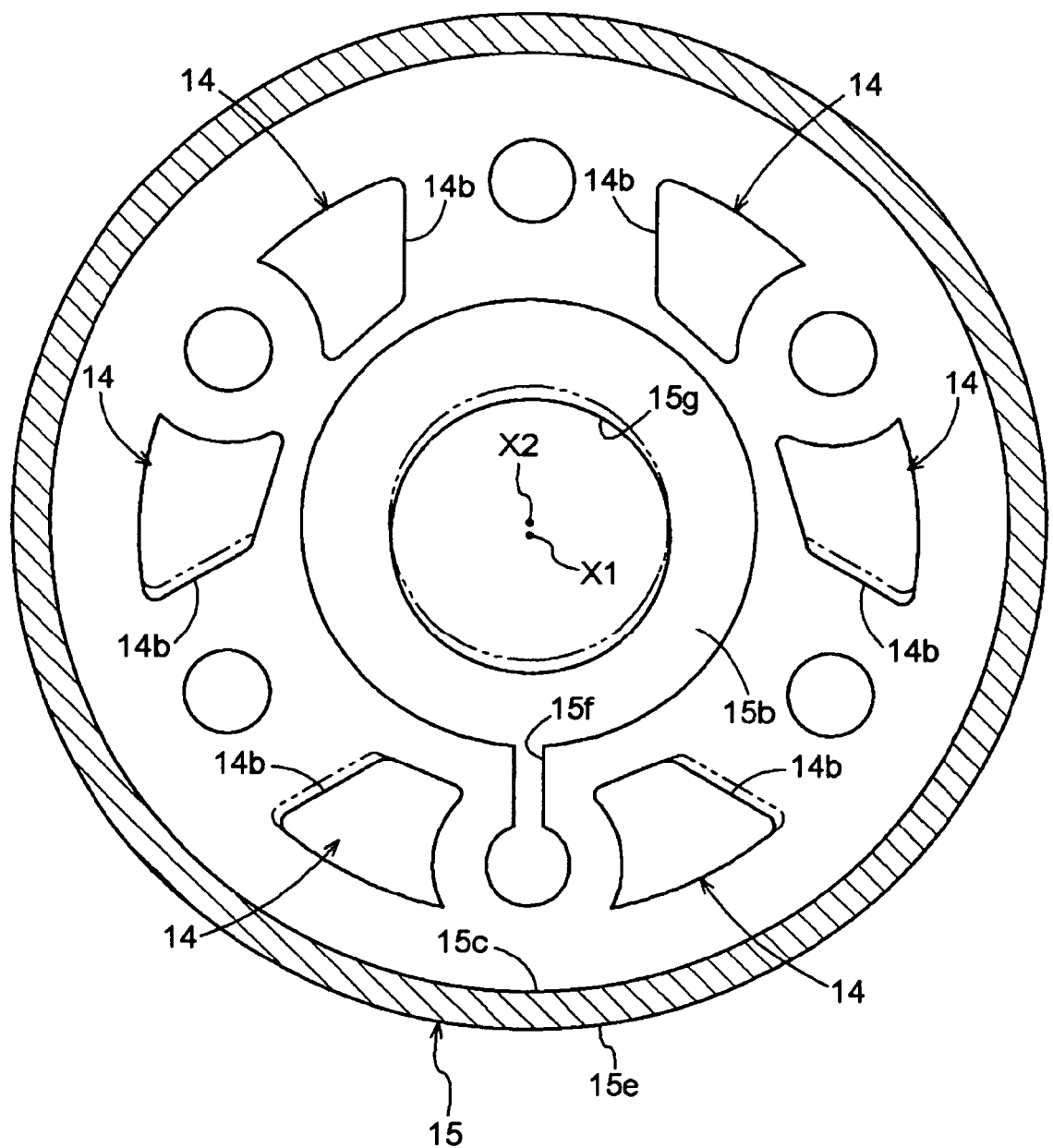
FIG. 6 is a front view showing a structure of a lower guide according to the first embodiment of the present invention.

FIG. 6 is a front view showing a structure of the lower guide 15. As shown in FIGS. 2 to 6, the lower guide 15 has a substantially disc shape. The concave portion that includes an inner peripheral face having a cylindrical shape and coaxial with an outer peripheral face 15e having a cylindrical shape is formed on the lower guide 15 on a side facing the upper gear 11. The cylindrical inner peripheral face of the concave portion forms an inner peripheral sliding face 15c (second sliding face) that faces the outer peripheral sliding face 11b of the upper gear 11 so as to be slidable thereon. That is, the outer peripheral sliding face 11b of the upper gear 11 makes slidably contact with the inner peripheral sliding face 15c of the lower guide 15, thereby achieving the upper gear 11 to slidably engage with the lower guide 15. As shown in FIGS. 4 to 6, an X2 is a center axis of the inner peripheral sliding face 15c. Then, a clearance C is formed between the inner peripheral sliding face 15c of the lower guide 15 and the outer peripheral sliding face 11b of the upper gear 11 so as to achieve a smooth sliding therebetween. In FIGS. 4 and 5, a size of the clearance C is exaggerated for an easy explanation.

A camshaft inserting hole 15g is formed on a radially center portion of the lower guide 15 and into which a cylindrical projecting portion 13e of the cam 13 is inserted. Since the cylindrical projecting portion 13e is rotatably inserted into the camshaft inserting hole 15g, the cam 13 is rotatably guided by the lower guide 15. According to the present embodiment, a center axis of the camshaft inserting hole 15g is arranged in an offset manner relative to a center of the lower guide 15, i.e. the center axis X2 of the inner peripheral sliding face 15c. In FIGS. 4 to 6, the center axis of the camshaft inserting hole 15g substantially overlaps the center axis X1 of the outer peripheral sliding face 11b and the inner peripheral face of the upper gear 11 on which the internal teeth 11a are formed. The arrangement of the center axis of the camshaft inserting hole 15g will be explained later in detail. According to the present embodiment, the cylindrical projecting portion 13e of the cam 13 constitutes a pivot shaft of the cam 13 while the camshaft inserting hole 15g constitutes a bearing for rotatably holding the pivot shaft.

Multiple (six, for example) guide portions 14 are formed at even intervals along the circumferential direction within the concave portion of the lower guide 15 for the purposes of guiding the pawls 12. Precisely, the guide portions 14 include pawl guiding faces 14b respectively, which are formed to extend in a substantially radial direction for the purposes of guiding the pawls 12 in the radial direction. The pawl guiding faces 14b of the guide portions 14 arranged next to each other are parallel to each other. According to the present embodiment, the guide portions 14 constitute radial guide portions for guiding the pawls 12 in the radial direction.

Further, the lower guide 15 includes a spring receiving concave portion 15b formed on a radially inner side of the aforementioned concave portion so as to be further dented and into which the locking spring 16 is received. Then, a cutting groove 15f is formed on a portion (i.e. lower portion in FIGS. 4 to 6) of an inner periphery of the spring receiving concave portion 15b, extending in a radially outward direction. An outer end portion 16a (see FIG. 2) of the locking spring 16 constituted by a spiral spring engages with the cutting groove 15f.

Furthermore, the lower guide 15 includes multiple (six, for example) engaging convex portions 15h (see FIG. 1) arranged at even intervals in the circumferential direction on a side not facing the upper gear 11. The seat cushion frame 4 includes multiple (six, for example) engaging bores 4a on positions facing the engaging convex portions 15h, respectively. While the engaging convex portions 15h engage with the engaging bores 4a, respectively, the lower guide 15 is integrally fixed to the seat cushion frame 4 by means of welding, and the like. The lower guide 15 having the aforementioned structure is formed by, for example, a half die cutting.

The ring holder 17 forms into a ring shape. The upper gear 11 and the lower guide 15 engaging with each other are disposed into the ring holder 17 so that the upper gear 11 and the lower guide 15 are not separated from each other in the axial direction while a relative rotation therebetween is still permitted.

As shown in FIGS. 2 to 6, the cam 13 includes a cam main body 13b having an irregular plate shape and multiple (three, for example) cam convex portions 13a, and the cylindrical projecting portion 13e constituting the pivot shaft of the cam 13. The multiple cam convex portions 13a are formed from a center to an outer side in the radial direction in a projecting manner and are arranged separately from each other in the circumferential direction. An outer peripheral end face of each cam convex portion 13a has a concavo-convex shape as in plan view (as shown in FIGS. 4 and 5), which forms a cam face 13c that makes contact with a contact face 12d of each pawl 12. In addition, projecting portions 13d are formed on respective cam concave portions 13a on a side facing the upper gear 11 so as to extend parallel to the cylindrical projecting portion 13e. The projecting portions 13d are inserted into engaging elongate bores 12c, respectively, formed on the pawls 12, which will be explained later.

The cylindrical projecting portion 13e is formed on a center of the cam main body 13b on a side facing the lower guide 15. As mentioned above, the cylindrical projecting portion 13e is rotatably disposed into the camshaft inserting hole 15g so as to constitute the pivot shaft of the cam 13. That is, the cylindrical projecting portion 13e is formed coaxially with the pivot axis of the cam 13. According to the present embodiment, the center axis of the cylindrical projecting portion 13e is equal to the pivot axis of the cam 13. Since the cylindrical projecting portion 13e is disposed into the camshaft inserting hole 15g of the lower guide 15 and thereby rotatably guided, the pivot axis of the cam 13 is also arranged, as well as the center axis of the camshaft inserting hole 15g, so as to substantially overlap the center axis X1 of the outer peripheral sliding face 11b and the inner peripheral face of the upper gear 11 where the internal teeth 11a are formed. The arrangement of the pivot axis of the cam 13 will be explained later in detail An insertion hole 13f is formed on a radially center portion of the cam 13, being coaxial with the cylindrical projecting portion 13e. Then, the lever shaft 6 is inserted into the insertion hole 13f so as not to be rotatable thereto. Accordingly, the cam 13 is integrally rotatable with the lever shaft 6 and the lever 5. Further, a cutting groove (not shown) is formed on a portion of the outer periphery of the cylindrical projecting portion 13e, extending in a radially inward direction. An inner end portion 16b (see FIG. 2) of the locking spring 16 engages with the cutting groove.

The locking spring 16 includes the outer end portion 16a engaging with the cutting groove 15f of the lower guide 15, and the inner end portion 16b engaging with the cutting groove (not shown) of the cam 13 as mentioned above. The locking spring 16 is the spiral spring wound in the counterclockwise direction from the inner peripheral side to the outer peripheral side when viewed from the side of the upper gear 11. Accordingly, the locking spring 16 biases the cam 13 in the counterclockwise direction (in FIGS. 4 and 5) when viewed from the side of the upper gear 11. That is, the locking spring 16 biases the cam 13 to a locked phase side in a rotation direction. The pawls 12 are biased by the locking spring 16 in a direction in which the pawls 12 are retained to engage with the internal teeth 11a of the upper gear 11.

The pawls 12 each form into a substantially rectangular shape. The multiple (three, for example) pawls 12 are arranged at even intervals in the circumferential direction. Each pawl 12 includes side faces 12b parallel to each other and slidably contacting with the respective pawl guiding faces 14b of the guide portions 14 formed on the lower guide 15, thereby achieving a radial movement of the pawls 12 relative to the lower guide 15. The external teeth 12a are formed on an outer peripheral end of each pawl 12 so as to engage with the internal teeth 11a of the upper gear 11. The external teeth 12a are arranged so as to face the internal teeth 11a.

The engaging elongate bore 12c is formed in the vicinity of an inner peripheral side of each pawl 12 so as to penetrate through the pawl 12 in a thickness direction. Each engaging elongate bore 12c is formed in such a manner that a longitudinal side thereof inclines towards a circumference defined with the center axis of the cylindrical projecting portion 13e, i.e. the pivot axis of the cam 13. In this case, the engaging elongate bore 12c is formed, inclining in the radially inward direction as approaching the locked phase side (i.e. counterclockwise direction in FIGS. 4 and 5) in the rotation direction of the cam 13. The projecting portions 13d are inserted into the engaging elongate bores 12c, respectively. Thus, the pawls 12 and the cam 13 engage with each other so as to operate together. Further, each pawl 12 includes a stepped portion on a side facing the lower guide 15. The stepped portion is formed on a substantially center portion in a longitudinal direction between the external teeth 12a and the engaging elongate bore 12c. The inner peripheral face of the stepped portion constitutes the contact face 12d that makes contact with each cam face 13c of the cam 13. The contact face 12d has a concavo-convex shape as in plan view (as shown in FIGS. 4 and 5) so as to correspond to the shape of the cam face 13c.

In the cases where the cam 13 rotates from the locked phase as shown in FIG. 5 to the unlocked phase as shown in FIG. 4, the projecting portions 13d of the cam 13 relatively move in the engaging elongate bores 12c, respectively, in the clockwise direction so as to press side faces of the engaging elongate bores 12c to the radially inward side. Accordingly, the pawls 12 move along the pawl guiding faces 14b of the guide portions 14 in the radially inward direction, thereby achieving a disengagement state between the external teeth 12a of the pawl 12 and the internal teeth 11a of the upper gear 11 as shown in FIG. 4. On the other hand, in the cases where the cam 13 rotates from the unlocked phase as shown in FIG. 4 to the locked phase as shown in FIG. 5, the projecting portions 13d of the cam 13 relatively move in the engaging elongate bores 12c, respectively, in the counterclockwise direction so as to press the side faces of the engaging elongate bores 12c to the radially outward side. Further, the cam faces 13c of the cam 13 press the contact faces 12d of the pawls 12 in the radially outward direction. Accordingly, the pawls 12 move along the pawl guiding faces 14b of the guide portions 14 in the radially outward direction, thereby achieving an engagement state between the external teeth 12a of the pawl 12 and the internal teeth 11a of the upper gear 11 as shown in FIG. 5. While the cam 13 rotates between the locked phase and the unlocked phase, the pawls 12 operate between the engaging state in which the external teeth 12a engage with the internal teeth 11a of the upper gear 11, and the disengaging state in which the external teeth 12a disengage from the internal teeth 11a. When the pawls 12 are in the disengaging state, the relative rotation between the upper gear 11 and the lower guide 15 is permitted while the relative rotation between the upper gear 11 and the lower guide 15 is prohibited when the pawls 12 are in the engaging state.

As explained above, the predetermined clearance C is formed between the inner peripheral sliding face 15c of the lower guide 15 and the outer peripheral sliding face 11b of the upper gear 11. Thus, when the locking device 1 is in the unlocked state as shown in FIG. 4, the upper gear 11 moves relative to the lower guide 15 within the clearance C, which leads to an offset between the center axes of the upper gear 11 and the lower guide 15. Then, when the seatback is tilted in the unlocked state, the seatback frame 3 normally receives a substantially downward load resulting from a weight of the seatback or a load applied to the seatback by an occupant. At this time, as shown in FIG. 4, the upper gear 11 attached to the seatback frame 3 moves downward by an amount corresponding to the clearance C relative to the lower guide 15 attached to the seat cushion frame 4. The center axis X1 of the outer peripheral sliding face 11b and the inner peripheral face of the upper gear 11 where the internal teeth 11a are formed is downwardly made offset relative to the center axis X2 of the inner peripheral sliding face 15c of the lower guide 15. At this time, if the cam 13 rotatably guided by the lower guide 15 is coaxial with the center axis X2 of the inner peripheral sliding face 15c of the lower guide 15 (i.e. center position of the lower guide 15), the pivot axis of the cam 13 is positioned upward relative to the center axis X1 of the inner peripheral face of the upper gear 11 where the internal teeth 11a are formed. In this case, the simultaneous engagement or disengagement of the three pawls 12, which are operated by the cam 13, with the internal teeth 11a of the upper gear 11 cannot be achieved, which leads to an uncomfortable operation feeling of the seat reclining apparatus 2.

Thus, according to the present embodiment, the pivot axis of the cam 13 is positioned in the offset manner beforehand relative to the center axis X2 of the inner peripheral sliding face 15c of the lower guide 15 so that the center axis X1 of the inner peripheral face where the internal teeth 11a are formed substantially overlaps the pivot axis of the cam 13 in a state in which the center axis X1 of the outer peripheral sliding face 11b of the upper gear 11 is made offset relative to the center axis X2 of the inner peripheral sliding face 15c of the lower guide 15 because of the load applied to the seatback frame 3 when the seatback is tilted. That is, as shown in FIG. 4, the center axis X1 of the outer peripheral sliding face 11b of the upper gear 11 is made offset downwardly by the amount corresponding to the clearance C relative to the center axis X2 of the inner peripheral sliding face 15C of the lower guide 15 because of the substantially downward load applied to the seatback frame 3 when the seatback is tilted. Thus, by considering this offset amount corresponding to the clearance C, the pivot axis of the cam 13 is positioned beforehand in the offset manner in a corresponding offset direction, i.e. downward direction in this case, relative to the center axis X2 of the inner peripheral sliding face 15c by the amount corresponding to the clearance C. In this case, precisely, the offset amount corresponding to the clearance C for the pivot axis of the cam 13 relative to the center axis X2 of the inner peripheral sliding face 15c (hereinafter simply called "offset amount corresponding to the clearance C") is equal to a size of the clearance C defined between the outer peripheral sliding face 11b and the inner peripheral sliding face 15C on a lower side thereof in a state in which the center axis X1 of the outer peripheral sliding face 11b of the upper gear 11 overlaps the center axis X2 of the inner peripheral sliding face 15c of the lower guide 15.

According to the aforementioned structure, the pivot axis of the cam 13 can substantially overlap the center axis X1 of the inner peripheral face of the upper gear 11 where the internal teeth 11a are formed when the seatback is tilted. Thus, the simultaneous engagement or disengagement of the three pawls 12, which are operated by the cam 13, with the internal teeth 11a can be achieved.

As shown in FIG. 6, in order to arrange the pivot axis of the cam 13 in the offset manner relative to the center axis X2 of the inner peripheral sliding face 15c of the lower guide 15, the center axis of the camshaft inserting hole 15g is arranged in the offset manner relative to the center axis X2 of the inner peripheral sliding face 15c. That is, in a state in which the upper gear 11 and the lower guide 15 are not coaxial with each other as mentioned above, the center axis of the camshaft inserting hole 15g of the lower guide 15 is arranged so as to overlap the center axis X1 of the inner peripheral face of the upper gear 11 where the internal teeth 11a are formed. A chain double-dashed line in FIG. 6 shows the arrangement of the camshaft inserting hole 15g and the pawl guiding faces 14b if the center axis X2 of the inner peripheral sliding face 15c of the lower guide 15 is coaxial with the pivot axis of the cam 13. Since the pivot axis of the cam 13 is equal to the center axis of the cylindrical projecting portion 13e disposed into the camshaft inserting hole 15g and thereby rotatably guided, the pivot axis of the cam 13 is arranged so as to overlap the center axis X1 of the inner peripheral face of the upper gear 11 where the internal teeth 11a are formed as shown in FIG. 4 by the arrangement of the center axis of the camshaft inserting hole 15g in the aforementioned offset manner. That is, the center of the camshaft inserting hole 15g of the lower guide 15 is downwardly made offset relative to the center axis X2 of the inner peripheral sliding face 15c.

According to the present embodiment, some of the pawl guiding faces 14b of the guide portions 14 of the lower guide 15 are arranged with reference to the pivot axis of the cam 13 and thus arranged in the offset manner relative to the center axis X2 of the inner peripheral sliding face 15c of the lower guide 15. Precisely, as shown in FIGS. 4 to 6, the pawl guiding faces 14b that guide two pawls 12 positioned on a lower side are arranged in the offset manner in the downward direction same as the offset direction of the pivot axis of the cam 13 relative to the center axis X2 of the inner peripheral sliding face 15c by the amount corresponding to the clearance C. That is, the circumferential lengths of the guide portions 14 are different from one another. The pawl guiding faces 14b that guide the pawl 12 formed on an upper side are not required to be arranged downwardly in the offset manner since these pawl guiding faces 14b are arranged in the vertical direction and thus the pawl 12 can be made downwardly offset in response to the arrangement of the pivot axis of the cam 13. Therefore, according to the present embodiment, the pawl guiding faces 14b guiding the pawl 12 arranged on the upper side is not offset relative to the center axis X2 of the inner peripheral sliding face 15c. Because of the arrangement of the pawl guiding faces 14b in the aforementioned manner, the pawls 12 are arranged with reference to the pivot axis of the cam 13 and thus arranged in the offset manner relative to the center axis X2 of the inner peripheral sliding face 15c of the lower guide 15. Thus, the simultaneous engagement or disengagement of the three pawls 12, which are operated by the cam 13, with the internal teeth 11a of the upper gear 11 can be further achieved.

By considering a machining error of each component of the locking device 1, it may be difficult to completely overlap the pivot axis of the cam 13 with the center axis X1 of the inner peripheral face of the upper gear 11 where the internal teeth 11a are formed, in a state in which the upper gear 11 is not coaxial with the lower guide 15 due to the load applied to the seatback frame 3 when the seatback is tilted. In this case, a different advantage can be obtained by specifying the offset amount of the pivot axis of the cam 13 relative to the center axis X2 of the inner peripheral sliding face 15c greater or smaller than the amount corresponding to the clearance C.

That is, when the offset amount of the pivot axis of the cam 13 relative to the center axis X2 of the inner peripheral sliding face 15c is specified greater than the amount corresponding to the clearance C, the pivot axis of the cam 13 is arranged lower than the position of the center axis X1 in a state in which the upper gear 11 is not coaxial with the lower guide 15, i.e. the upper gear 11 is downwardly positioned relative to the lower guide 15. Accordingly, when the locking device 1 is in the locked state, an upper face of the cylindrical projecting portion 13e of the cam 13 presses an upper face of the camshaft inserting hole 15g in an upward direction while the external teeth 12a of the two pawls 12 arranged on the lower side press the internal teeth 11a of the upper gear 11 in the downward direction. Thus, looseness between the upper gear 11 and the lower guide 15, and between the cylindrical projecting portion 13e of the cam 13 and the camshaft inserting hole 15g of the lower guide 15 can be prevented when the locking device 1 is in the locked state.

Meanwhile, when the offset amount of the pivot axis of the cam 13 is specified smaller than the amount corresponding to the clearance C, the aforementioned pressing force is not applied. Thus, the external teeth 12a of the pawls 12 engage with the internal teeth 11a in a state in which even load is applied to the three pawls 12, respectively.

Figure 7:
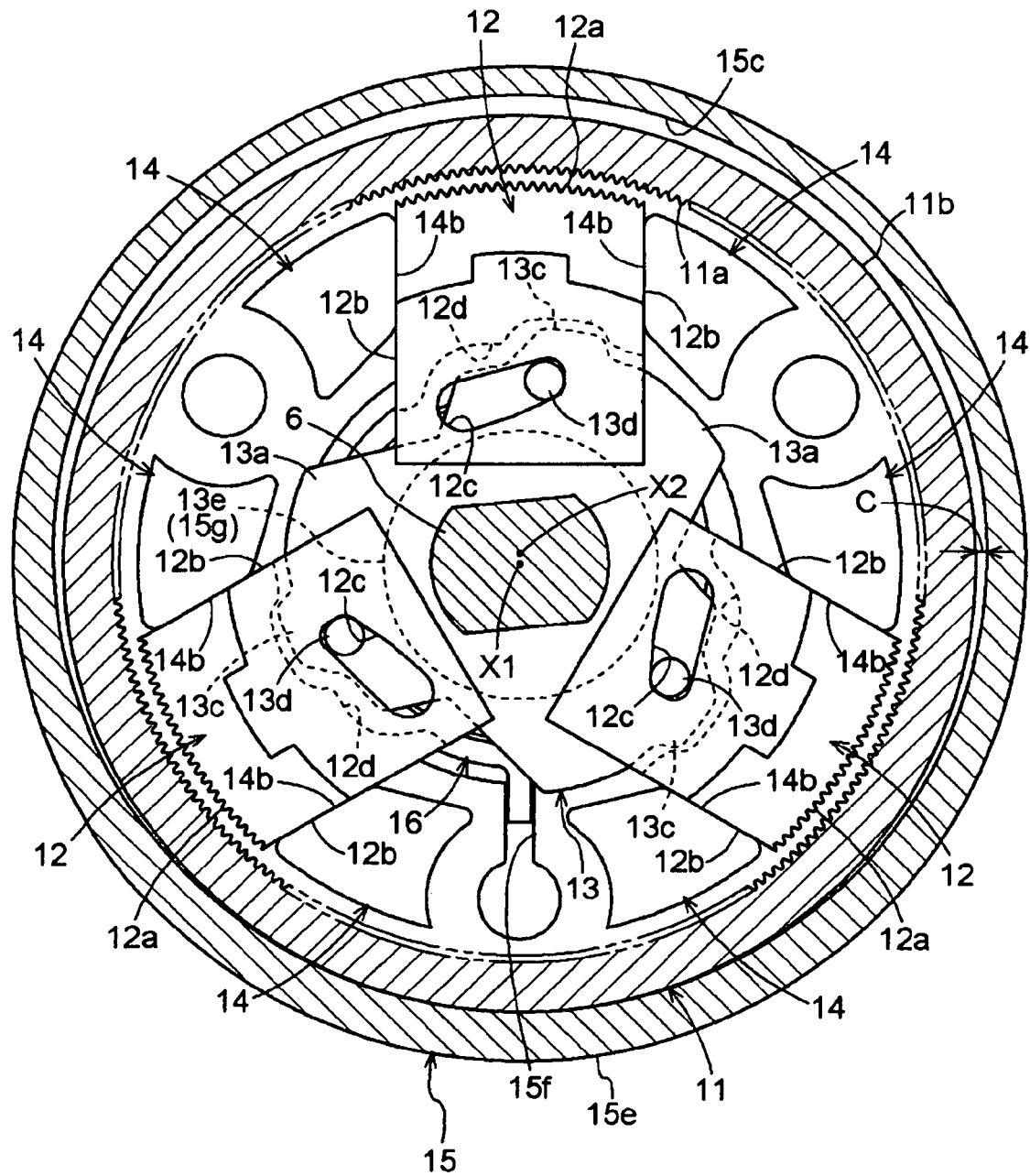
FIG. 7 is an internal structure view of a locking device of the seat reclining apparatus according to a second embodiment of the present invention.

A second embodiment of the present invention will be explained with reference to FIG. 7, which is an internal structure view showing the locking device 1 of the seat reclining apparatus 2 according to the second embodiment. As shown in FIG. 7, the center axis X2 of the inner peripheral sliding face 15c of the lower guide 15 is arranged in the offset manner relative to a center axis of the outer peripheral face 15e of the lower guide 15 and the pivot axis of the cam 13 (which overlaps the center axis X1 of the outer peripheral sliding face 11b of the upper gear 11 in FIG. 7) coaxial with the outer peripheral face 15e, thereby achieving the arrangement of the pivot axis of the cam 13 in the offset manner relative to the center axis X2 of the inner peripheral sliding face 15c of the lower guide 15. Such structure is different from that of the first embodiment in which the inner peripheral sliding face 15c of the lower guide 15 is coaxial with the outer peripheral face 15e. The rest structure of the second embodiment is same as that of the first embodiment. In the following, the different point of the second embodiment from the first embodiment will be mainly explained.

According to the second embodiment, the center axis X2 of the inner peripheral sliding face 15c of the lower guide 15 is arranged in the offset manner relative to the pivot axis of the cam 13 in such a manner that the center axis X1 of the inner peripheral face of the upper gear 11 where the internal teeth 11a are formed substantially overlaps the pivot axis of the cam 13 in a state in which the center axis X1 of the outer peripheral sliding face 11b of the upper gear 11 is made offset to the center axis X2 of the inner peripheral sliding face 15c of the lower guide 15 because of the load applied to the seatback frame 3 when the seatback is tilted. In this case, the cam 13 is arranged so as to be coaxial with the outer peripheral face 15e of the lower guide 15. According to such arrangement of the center axis X2 of the inner peripheral sliding face 15c, the pivot axis of the cam 13 is arranged in the offset manner relative to the center axis X2 of the inner peripheral sliding face 15c. That is, as shown in FIG. 7, the center axis X1 of the outer peripheral sliding face 11b of the upper gear 11 is made offset downwardly by the amount corresponding to the clearance C relative to the center axis X2 of the inner peripheral sliding face 15c of the lower guide 15 because of the substantially downward load applied to the seatback frame 3 when the seatback is tilted. Then, by considering this amount corresponding to the clearance C, the center axis X2 of the inner peripheral sliding face 15c is positioned beforehand in the offset manner in an opposite direction to the offset direction of the center axis X1 of the outer peripheral sliding face 11b relative to the center axis X2 of the inner peripheral sliding face 15c, i.e. upward direction in this case, relative to the pivot axis of the cam 13 by the amount substantially equal to the clearance C. That is, as shown in FIG. 7, the lower guide 15 is formed in such a manner that a radial thickness between the inner peripheral sliding face 15c and the outer peripheral face 15e is gradually thinner towards an upper side and gradually thicker towards a lower side. Thus, the pivot axis of the cam 13 is arranged in the offset manner in the downward direction relative to the center axis X2 of the inner peripheral sliding face 15c by the amount corresponding to the clearance C. Accordingly, same as the first embodiment, the pivot axis of the cam 13 overlaps the center axis X1 of the inner peripheral face of the upper gear 11 where the internal teeth 11a are formed when the seatback is tilted.

Further, according to the second embodiment, the multiple pawl guiding faces 14b are formed with reference to the pivot axis of the cam 13. Thus, the pawl guiding faces 14b are also arranged in the offset manner relative to the center axis X2 of the inner peripheral sliding face 15c of the lower guide 15. The simultaneous engagement or disengagement of the three pawls 12 operated by the cam 13 with the internal teeth 11a of the upper gear 11 can be achieved.

Figure 8:
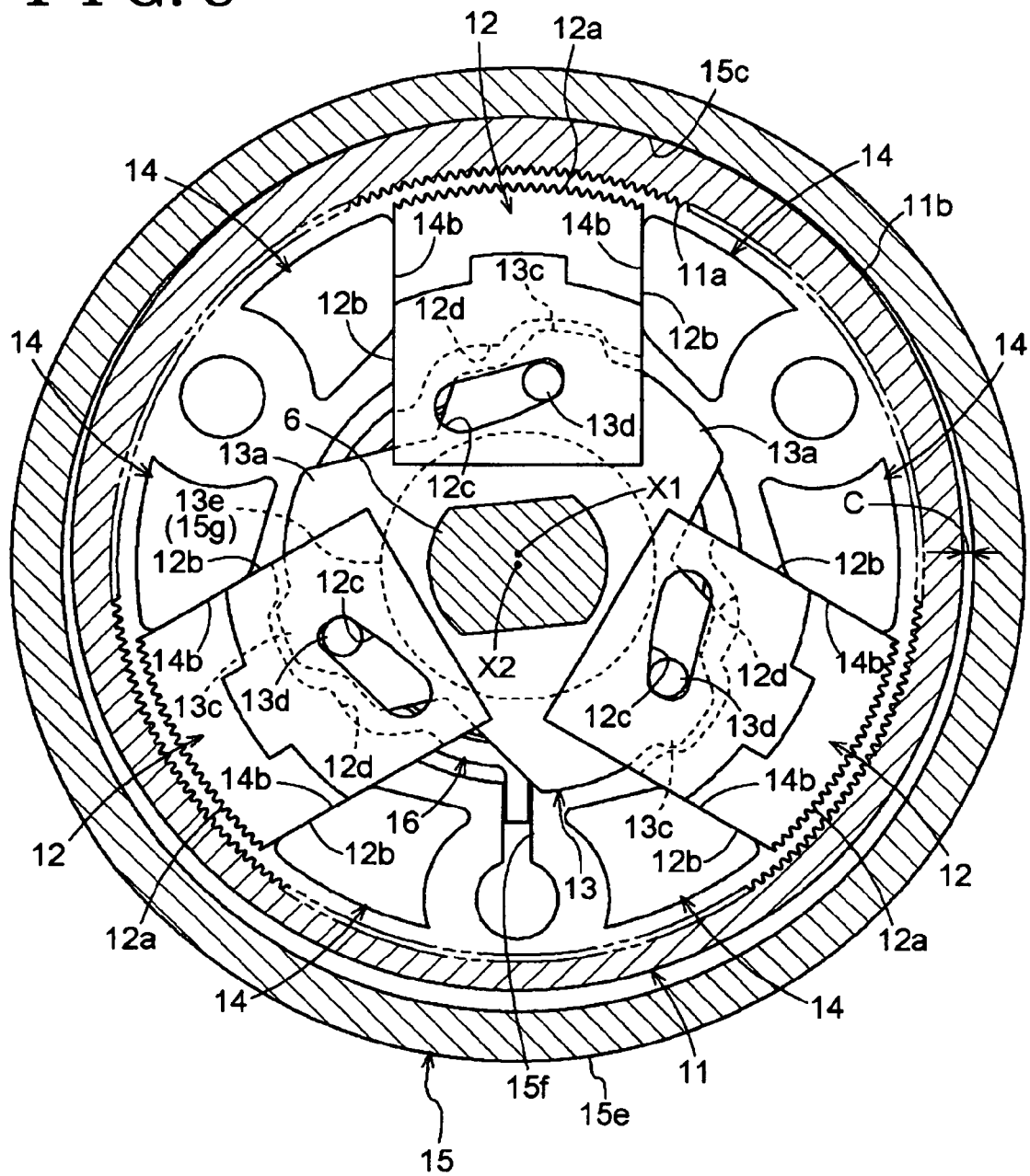
FIG. 8 is an internal structure view of a locking device of the seat reclining apparatus according to a third embodiment of the present invention.

A third embodiment of the present invention will be explained with reference to FIG. 8, which is an internal structure view of the locking device 1 of the seat reclining apparatus 2 according to the third embodiment. As shown in FIG. 8, members on the seatback side and the seat cushion side are exchanged therebetween. That is, the lower guide 15 is attached to the seatback frame 3 while the upper gear 11 is attached to the seat cushion frame 4. In addition, the center axis of the inner peripheral face of the upper gear 11 where the internal teeth 11a are formed is arranged in the offset manner relative to the center axis X1 of the outer peripheral sliding face 11b, and the cam 13 is coaxial with the inner peripheral sliding face 15c of the lower guide 15. Such structure is different from that of the first embodiment but the rest structure of the third embodiment is same as the first embodiment. In the following, the different point of the third embodiment from the first embodiment will be mainly explained.

According to the third embodiment, the center axis of the inner peripheral face of the upper gear 11 where the internal teeth 11a are formed is arranged in the offset manner relative to the center axis X1 of the outer peripheral sliding face 11b in such a manner that the center axis of the inner peripheral face of the upper gear 11 where the internal teeth 11a are formed substantially overlaps the pivot axis X2 of the cam 13 in a state in which the center axis X2 of the inner peripheral sliding face 15c of the lower guide 15 is made offset to the center axis X1 of the outer peripheral sliding face 11b of the upper gear 11 because of the load applied to the seatback frame 3 when the seatback is tilted. That is, as shown in FIG. 8, the center axis X2 of the inner peripheral sliding face 15c of the lower guide 15 is made offset in the downward direction by the amount corresponding to the clearance C relative to the center axis X1 of the outer peripheral sliding face 11b of the upper gear 11. Then, by considering this amount corresponding to the clearance C, the center axis of the inner peripheral face of the upper gear 11 where the internal teeth 11a are formed is arranged in the offset manner in a corresponding offset direction, i.e. upward direction in this case, relative to the center axis X1 of the outer peripheral sliding face 11b by the amount substantially equal to the clearance C. That is, according to the third embodiment, as shown in FIG. 8, the upper gear 11 is formed in such a manner that a radial thickness between the inner peripheral face where the internal teeth 11a are formed and the outer peripheral sliding face 11b is gradually thicker towards an upper side and gradually thinner towards a lower side. Accordingly, same as the first embodiment, the center axis of the inner peripheral face of the upper gear 11 where the internal teeth 11a are formed substantially overlaps the pivot axis X2 of the cam 13. The simultaneous engagement or disengagement of the three pawls 12 operated by the cam 13 with the internal teeth 11a of the upper gear 11 can be achieved.

Figure 9:
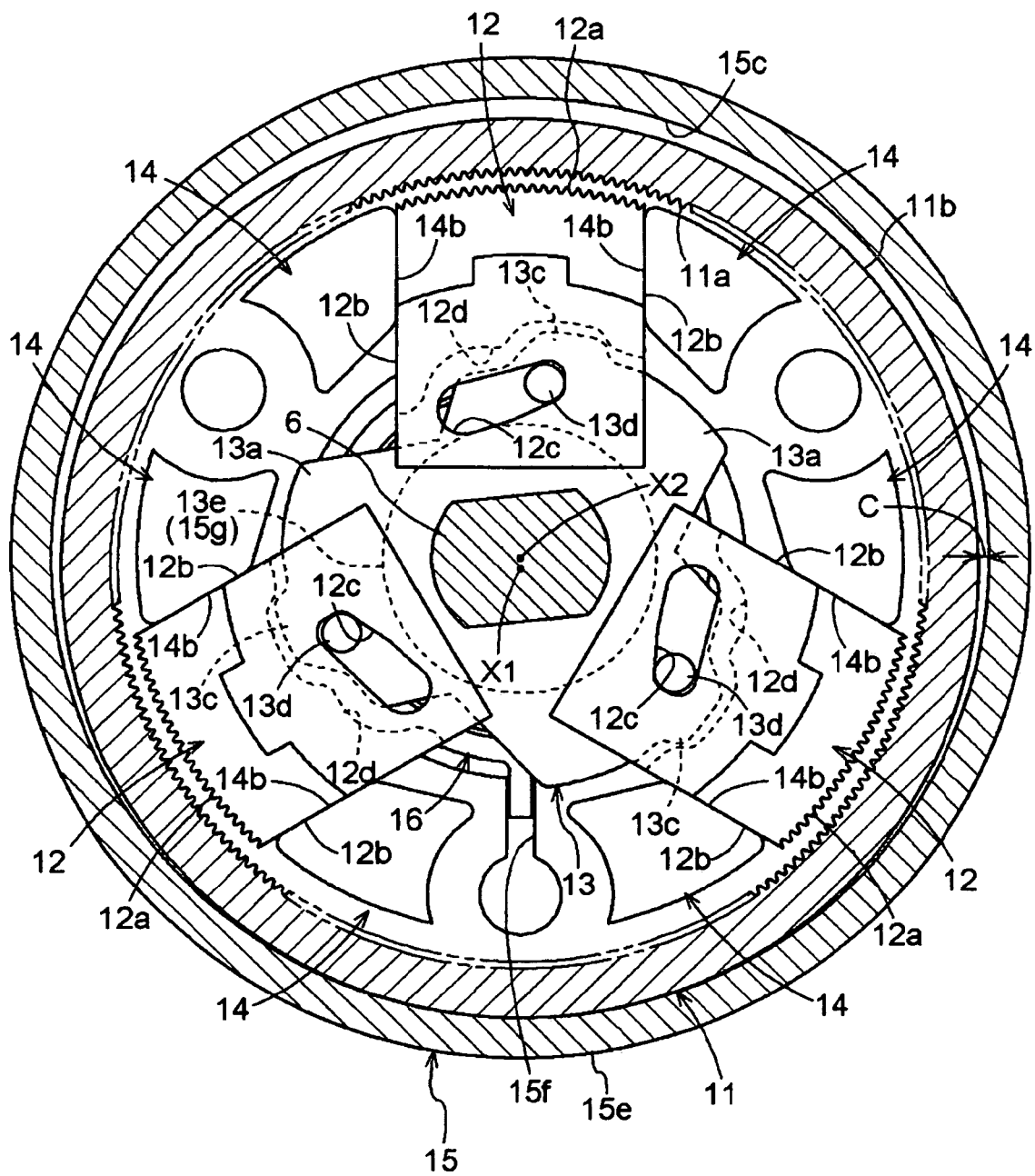
FIG. 9 is an internal structure view of a locking device of the seat reclining apparatus according to a fourth embodiment of the present invention.

A fourth embodiment of the present invention will be explained with reference to FIG. 9, which is an internal structure view of the locking device 1 of the seat reclining apparatus 2 according to the fourth embodiment. As shown in FIG. 9, the cam 13 is coaxial with the center axis X2 of the inner peripheral sliding face 15c of the lower guide 15. In addition, the cam 13 forms into a shape so as to respond to the direction and amount of offset of the center axis X1 of the inner peripheral face of the upper gear 11 where the internal teeth 11a are formed while the upper gear 11 is not coaxial with the lower guide 15. Such structure is different from that of the first embodiment but the rest structure is same as the first embodiment. In the following, the different point of the second embodiment from the first embodiment will be mainly explained.

According to the fourth embodiment, the cam 13 is arranged coaxial with the center axis X2 of the inner peripheral sliding face 15c of the lower guide 15. Then, the cam 13 forms into a shape so as to respond to the direction and amount of offset of the center axis X1 of the inner peripheral face of the upper gear 11 where the internal teeth 11a are formed relative to the pivot axis X2 of the cam 13 while the center axis X1 of the outer peripheral sliding face 11b of the upper gear 11 is made offset to the center axis X2 of the inner peripheral sliding face 15c because of the load applied to the seatback frame 3 when the seatback is tilted. That is, as shown in FIG. 9, the center axis of the outer peripheral sliding face 11b of the upper gear 11 is made offset in the downward direction by the amount corresponding to the clearance C relative to the center axis X2 of the inner peripheral sliding face 15c of the lower guide 15 because of the substantially downward load applied to the seatback frame 3 when the seatback is tilted. Then, the shape of the cam 13 is defined by considering this offset amount corresponding to the clearance C. According to the fourth embodiment, the shape of the cam 13 includes the arrangement and shape of the cam faces 13c, and the arrangement of the projecting portions 13d. The shape of the cam 13 is defined, by regarding the direction and the amount of offset of the center axis X1 of the inter peripheral face where the internal teeth 11a are formed, in such a manner that equal spaces are formed between the external teeth 12a of the three pawls 12 and the internal teeth 11a of the upper gear 11 facing thereto, respectively, in each phase of the cam 13.

More precisely, in each phase of the cam 13 between the unlocked phase (as shown in FIG. 9) and the locked phase, two pawls 12 arranged on the lower side are positioned so as to project in the radially outward direction from a reference circle defined with reference to the pivot axis X2 of the cam 13 having a predetermined radius. The pawl 12 arranged on the upper side is positioned so as to retract in the radially inward direction from the reference circle. The extending amount or the retracting amount of each pawl 12 relative to the reference circle is specified such that spaces formed between the external teeth 12a of the three pawls 12 and the internal teeth 11a of the upper gear 11 are substantially equal to each other when the upper gear 11 is not coaxial with the lower guide 15 because of the load applied to the seatback frame 3 in the cases where the seatback is tilted. Thus, when the cam 13 is in the unlocked phase, for example, a center of the cam main body 13b is offset relative to the pivot axis of the cam 13 so as to substantially overlap the center axis X1 of the inner peripheral face of the upper gear 11 where the internal teeth 11a are formed. Further, by considering the rotation of the cam 13 from the unlocked phase to the locked phase, the shape of the cam faces 13c and the arrangement of the projecting portions 13d may be adjusted for defining the shape of the cam 13. Accordingly, the simultaneous engagement or disengagement of the three pawls 12 with the internal teeth 11a when the seatback is tilted can be achieved. That is, distances from the pivot axis X2 to the cam faces 13c of the cam convex portions 13a respectively are different from each other.

Figure 10:
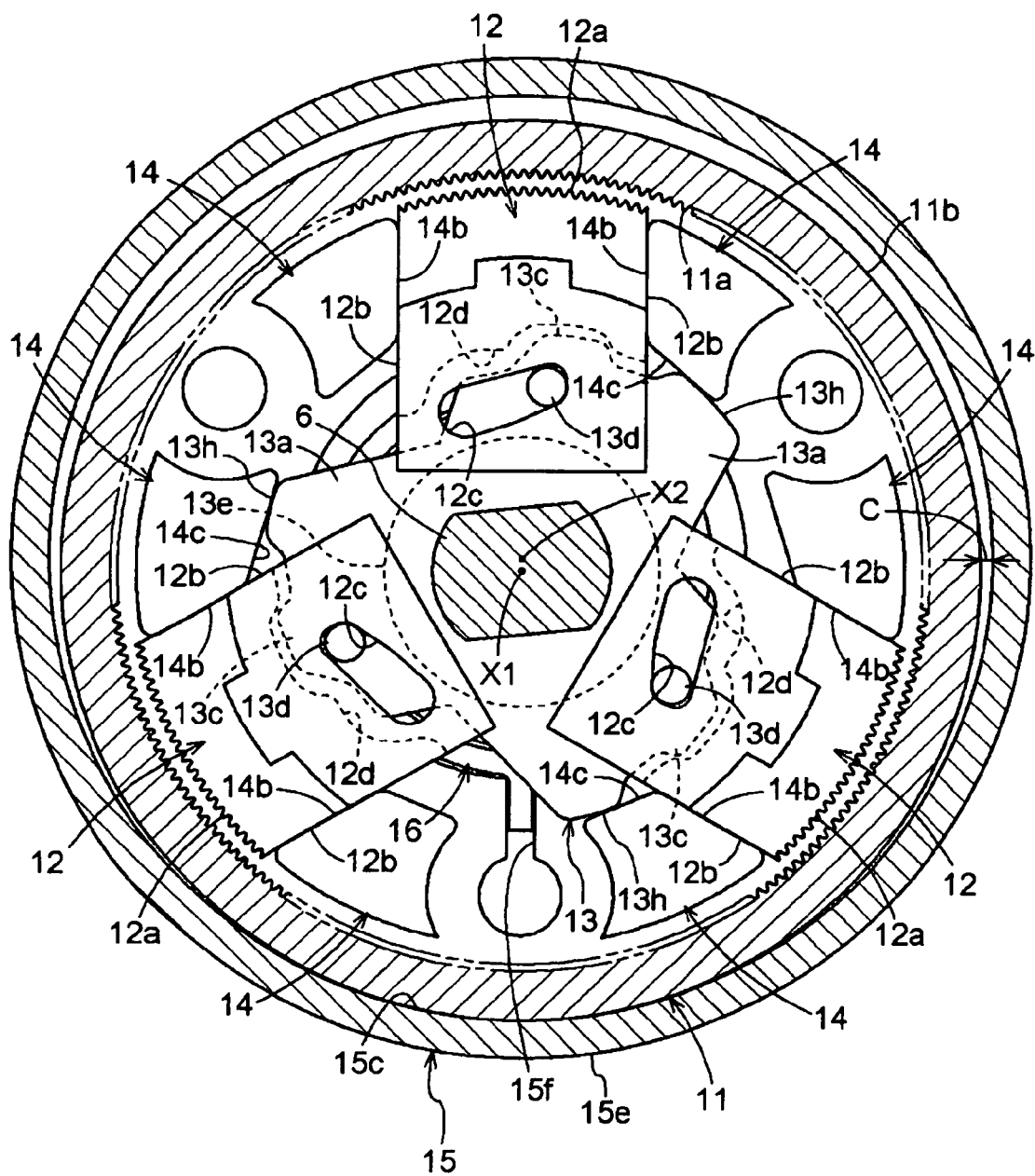
FIG. 10 is an internal structure view of a locking device of the seat reclining apparatus according to a fifth embodiment of the present invention.
Figure 11:
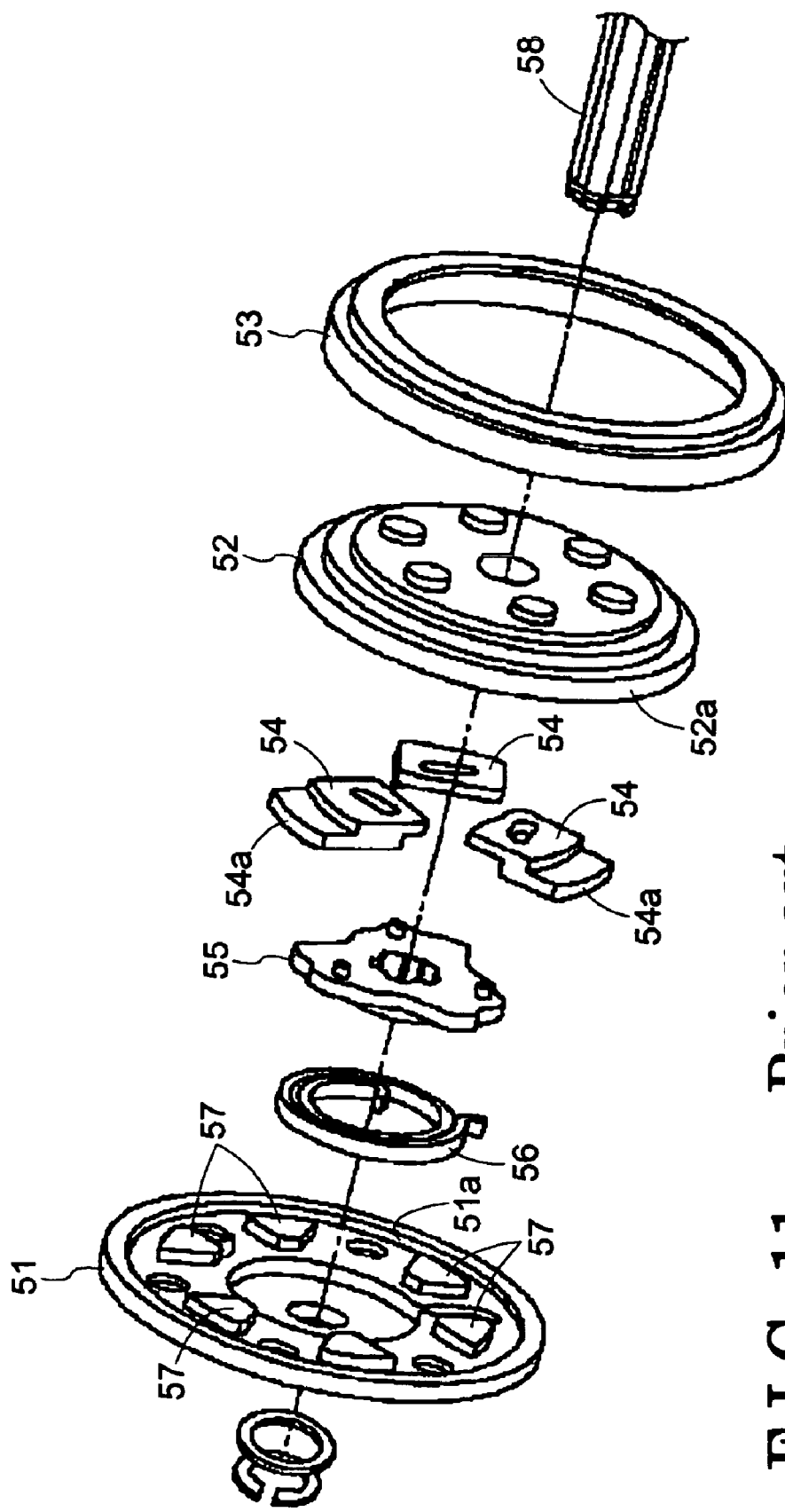
FIG. 11 is an exploded perspective view of a seat reclining apparatus according to a conventional invention.
Figure 12:
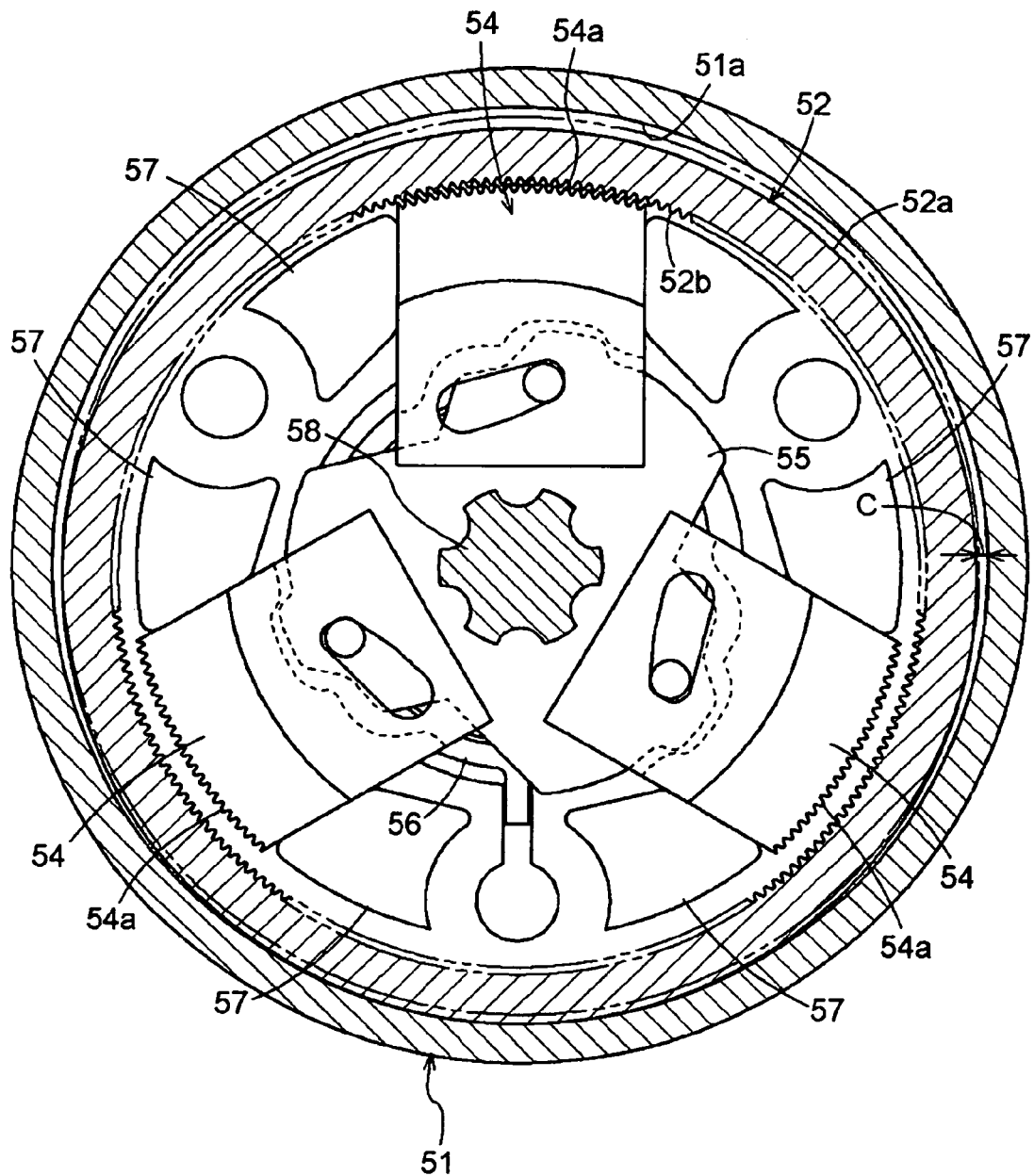
FIG. 12 is an internal structure view of a locking device of the seat reclining apparatus according to the conventional invention.

A fifth embodiment of the present invention will be explained with reference to FIG. 10, which is an internal structure view of the locking device 1 of the seat reclining apparatus 2 according to the fifth embodiment. As shown in FIG. 10, the fifth embodiment is different from the first embodiment in a point in which guided faces 13h formed on the outer peripheral face of the cam 13 are guided by cam guiding faces 14c formed on the inner peripheral faces of the guide portions 14, respectively, so as to rotate the cam 13. That is, the lower guide 15 includes the cam guiding faces 14c as the circumferential guiding faces for guiding the guided faces 13h formed as a part of the outer peripheral face of the cam 13 in the circumferential direction. Thus, according to the fifth embodiment, the camshaft inserting hole 15g is not formed on the lower guide 15, however, an opening hole (not shown) into which the lever shaft 6 is inserted is formed instead. The rest structure is same as that of the first embodiment.

According to the first to fourth embodiments, the cylindrical projecting portion 13e constitutes the pivot shaft of the cam 13 while the camshaft inserting hole 15g formed on the lower guide 15 and into which the cylindrical projecting portion 13e is inserted constitutes the bearing. However, the pivot shaft of the cam 13 can be formed on the lower guide 15 while the bearing into which the pivot shaft is inserted can be formed on the cam 13. Further, various structures may be considered for guiding the cam 13 in a rotatable manner such as the outer peripheral face of the cam 13 rotatably guided by the inner peripheral face of the guide portions 14 of the lower guide 15 according to the fifth embodiment.

The aforementioned embodiments are explained with preconditions that the substantially downward load is applied to the seatback frame 3 when the seatback is tilted. However, depending on a seat structure, the load applied to the seatback frame 3 when the seatback is tilted may be not in the downward direction. When any one of the embodiments is employed in the seat reclining apparatus 2 for such seat, the structure is required so as to correspond to the direction of the load applied to the seatback frame 3 when the seatback is tilted.

Furthermore, according to the aforementioned embodiments, the center axis of the lower guide 15 and the like, and the upper gear 11 whichever is attached to the seat cushion frame 4 is arranged in an offset manner relative to the center axis of the lower guide 15 and the like, and the upper gear 11 whichever is attached to the seatback frame 3 by the amount corresponding to the clearance C formed between the upper gear 11 and the lower guide 15. According to such structure, the offset direction is unchanged in response to the change in the tilt angle of the seatback frame 3 relative to the seat cushion frame 4. Thus, this structure is specifically suitable when the member attached to the seatback frame 3 is made offset in the equal direction (downward direction, for example) regardless of the tilt angle of the seatback frame 3. However, the structure of the seat reclining apparatus 2 according to the aforementioned embodiments is not limited to the above. That is, the members attached to the seat cushion frame 4 and the members attached to the seatback frame 3 are exchanged each other. Then, the center axis of the the lower guide 15 and the like, and the upper gear 11 whichever is attached to the seatback frame 3 is arranged in an offset manner relative to the center axis of the lower guide 15 and the like, and the upper gear 11 whichever is attached to the seat cushion frame 4 by the amount corresponding to the clearance C formed between the upper gear 11 and the lower guide 15. According to such structure, the offset direction is changed in response to the change in the tilt angle of the seatback frame 3. Thus, this structure is specifically suitable when the member attached to the seatback frame 3 is made offset in a direction corresponding to the tilt angle of the seatback frame 3. A range of the tilt angle of the seatback actually used is not wide. Thus, even when this structure is used in a case where the member attached to the seatback frame 3 is offset in the identical direction (substantially downward direction, for example) regardless of the tilt angle of the seatback frame 3, the advantage of the aforementioned embodiments can be still obtained.

Furthermore, according to the aforementioned embodiments, the outer peripheral sliding face 11b of the upper gear 11, the inner peripheral sliding face 15c of the lower guide 15, and the inner peripheral face of the upper gear 11 where the internal teeth 11a are formed all have the cylindrical shape. However, the cylindrical shape is one example of the circumferential shape in cross-section, and the other shape than the cylindrical shape such as a truncated conical cylinder is available.

Furthermore, according to the aforementioned embodiments, the seat reclining apparatus 2 is employed in the vehicle seat. However, the embodiments can be employed in various seats besides the vehicle seat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus comprising:
    a first member attached to one of a seatback frame and a seat cushion frame and including engaged portions;
    a second member attached to an other one of the seatback frame and the seat cushion frame and rotatably engageable with the first member;
    engaging members interposed between the first member and the second member;
    a cam member rotatably guided by the second member and bringing the engaging members engageable with the engaged portions to move in a radial direction so as to engage or disengage between the engaged portions and the engaging members;

the cam member including a pivot axis arranged in such a manner that a simultaneous engagement or disengagement is achieved among each engaging member and the corresponding engaged portion when a center axis of the first member and a center axis of the second member are offset to each other by an amount corresponding to a clearance formed at a rotatably connecting portion between the first member and the second member because of a load applied to the seatback frame in a case where a seatback is tilted;

the first member including a first sliding face having a circumferential shape in cross-section and the engaged portions arranged along a periphery coaxial with the first sliding face;

the second member including a second sliding face having a circumferential shape in cross-section and facing the first sliding face so as to be slidable thereon; and the pivot axis of the cam member arranged in an offset manner relative to a center axis of the second sliding face so that a center axis of the periphery where the engaged portions are formed and the pivot axis of the cam member overlap each other when a center axis of the first sliding face and the center axis of the second sliding face are made offset to each other by the amount corresponding to the clearance formed between the first sliding face and the second sliding face because of the load applied to the seatback frame in a case where the seatback is tilted.

2. A seat reclining apparatus according to claim 1, wherein the pivot axis of the cam member is arranged in an offset manner relative to the center axis of the second sliding face in a direction in which the center axis of the first sliding face is offset to the center axis of the second sliding face by an amount equal to an offset amount of the center axis of the first sliding face relative to the center axis of the second sliding face obtained when the seatback is tilted.

3. A seat reclining apparatus according to claim 2, wherein the second member includes radial guide portions for guiding the engaging members in a radial direction, the radial guide portions being arranged in an offset manner relative to the center axis of the second sliding face so as to respond to a position of the pivot axis of the cam member.

4. A seat reclining apparatus according to claim 1, wherein the second member includes radial guide portions for guiding the engaging members in a radial direction, the radial guide portions being arranged in an offset manner relative to the center axis of the second sliding face so as to respond to a position of the pivot axis of the cam member.

5. A seat reclining apparatus according to claim 1, wherein one of the cam member and the second member includes a pivot shaft projecting so as to be coaxial with the pivot axis of the cam member, and an other one of the cam member and the second member includes a bearing for rotatably supporting the pivot shaft.

6. A seat reclining apparatus according to claim 1, wherein the second member includes circumferential guide faces for guiding guided faces formed on an outer peripheral side of the cam member.

7. A seat reclining apparatus comprising:
a first member attached to one of a seatback frame and a seat cushion frame and including engaged portions;
a second member attached to an other one of the seatback frame and the seat cushion frame and rotatably engageable with the first member;
engaging members interposed between the first member and the second member;
a cam member rotatably guided by the second member and bringing the engaging members engageable with the engaged portions to move in a radial direction so as to engage or disengage between the engaged portions and the engaging members;

the cam member including a pivot axis arranged in such a manner that a simultaneous engagement or disengagement is achieved among each engaging member and the corresponding engaged portion when a center axis of the first member and a center axis of the second member are offset to each other by an amount corresponding to a clearance formed at a rotatably connecting portion between the first member and the second member because of a load applied to the seatback frame in a case where a seatback is tilted;

the first member including a first sliding face having a circumferential shape in cross-section and the engaged portions arranged along a circumferential direction;

the second member including a second sliding face having a circumferential shape in cross-section and facing the first sliding face so as to be slidable thereon; and the cam member coaxial with the second member and thereby rotatably guided;

wherein a center of a periphery where the engaged portions are formed is arranged in an offset manner relative to a center axis of the first sliding face so that the center of the periphery where the engaged portions are formed and the pivot axis of the cam member overlap each other when the center axis of the first sliding face and a center axis of the second sliding face are made offset to each other by the amount corresponding to the clearance formed between the first sliding face and the second sliding face because of the load applied to the seatback frame in a case where the seatback is tilted.

8. A seat reclining apparatus according to claim 7, wherein one of the cam member and the second member includes a pivot shaft projecting so as to be coaxial with the pivot axis of the cam member, and an other one of the cam member and the second member includes a bearing for rotatably supporting the pivot shaft.

9. A seat reclining apparatus according to claim 7, wherein the second member includes circumferential guide faces for guiding guided faces formed on an outer peripheral side of the cam member.

10. A seat reclining apparatus comprising:
a first member attached to one of a seatback frame and a seat cushion frame and including engaged portions;
a second member attached to an other one of the seatback frame and the seat cushion frame and rotatably engageable with the first member;
engaging members interposed between the first member and the second member;
a cam member rotatably guided by the second member and bringing the engaging members engageable with the engaged portions to move in a radial direction so as to engage or disengage between the engaged portions and the engaging members;

the cam member including a pivot axis arranged in such a manner that a simultaneous engagement or disengagement is achieved among each engaging member and the corresponding engaged portion when a center axis of the first member and a center axis of the second member are offset to each other by an amount corresponding to a clearance formed at a rotatably connecting portion between the first member and the second member because of a load applied to the seatback frame in a case where a seatback is tilted;

the first member including a first sliding face having a circumferential shape in cross-section and the engaged portions arranged along a periphery coaxial with the first sliding face;

the second member including a second sliding face having a circumferential shape in cross-section and facing the first sliding face so as to be slidable thereon; and the cam member coaxial with the second member and thereby rotatably guided, the cam member including a cam shape defined so as to respond to a direction and an amount of offset of a center axis of the periphery where the engaged portions are formed relative to the pivot axis of the cam member when a center axis of the first sliding face and a center axis of the second sliding face are offset to each other by the amount corresponding to the clearance formed between the first sliding face and the second sliding face because of the load applied to the seatback frame in a case where the seatback is tilted.

11. A seat reclining apparatus according to claim 10, wherein one of the cam member and the second member includes a pivot shaft projecting so as to be coaxial with the pivot axis of the cam member, and an other one of the cam member and the second member includes a bearing for rotatably supporting the pivot shaft.

12. A seat reclining apparatus according to claim 10, wherein the second member includes circumferential guide faces for guiding guided faces formed on an outer peripheral side of the cam member.

* * * * *